United States Patent
Kawakami et al.

(10) Patent No.: US 7,079,284 B2
(45) Date of Patent: Jul. 18, 2006

(54) IMAGE PROCESSING APPARATUS (75) Inventors: Haruko Kawakami, Funabashi (JP); Takayuki Sawada, Tokyo (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1004 days.

(21) Appl. No.: 09/973,043

(22) Filed: Oct. 10, 2001

(65) Prior Publication Data
US 2003/0067615 A1 Apr. 10, 2003

(51) Int. Cl.
*G06F 15/00* (2006.01)

(52) U.S. Cl. .............. 358/1.9; 358/515; 358/518; 358/520; 358/2.1; 345/590; 345/589; 382/167; 382/162; 382/173; 348/453

(58) Field of Classification Search ........... 358/2.1, 358/518, 1.9, 515, 520; 382/165, 162, 167
See application file for complete search history.

(56) References Cited

U.S. PATENT DOCUMENTS

| | | | |
|---|---|---|---|
| 4,547,811 A | 10/1985 | Ochi et al. | |
| 4,941,038 A * | 7/1990 | Walowit | 358/518 |
| 5,136,401 A | 8/1992 | Yamamoto et al. | |
| 5,426,517 A * | 6/1995 | Schwartz | 358/520 |
| 5,844,699 A * | 12/1998 | Usami et al. | 358/518 |
| 6,014,457 A * | 1/2000 | Kubo et al. | 382/167 |
| 6,882,445 B1 * | 4/2005 | Takahashi et al. | 358/1.9 |
| 6,894,808 B1 * | 5/2005 | Hamamura et al. | 358/1.9 |
| 6,897,988 B1 * | 5/2005 | Saito et al. | 358/515 |
| 2002/0031256 A1 * | 3/2002 | Hiramatsu et al. | 382/162 |
| 2002/0081023 A1 * | 6/2002 | Uchida | 382/165 |
| 2004/0212838 A1 * | 10/2004 | Yamamoto et al. | 358/2.1 |

FOREIGN PATENT DOCUMENTS

| | | |
|---|---|---|
| JP | 58-3374 | 1/1983 |
| JP | 7-298073 | 11/1995 |

OTHER PUBLICATIONS

The Journal of The Institute of Image Electronics Engineers of Japan, vol. 29, No. 5; Chan. Hung-Shing et al.; Oct. 2000.

* cited by examiner

*Primary Examiner*—Kimberly Williams
*Assistant Examiner*—Ashish K. Thomas
(74) *Attorney, Agent, or Firm*—Foley & Lardner LLP (57) ABSTRACT

An image processing apparatus which processes a plurality of supplied color image signals and outputs the processed signals to an image forming apparatus. The image processing apparatus comprises a conversion section which converts the supplied color image signals to a plurality of color signals, a discrimination section which discriminates attributes of the supplied color image signals, a determination section which determines, based on the color signals converted by the conversion section, a plurality of color signals outside a color gamut capable of image formation in the image forming apparatus, a processing section which changes the color signals outside the color gamut determined by the determination section to a plurality of color signals in the color gamut of the image forming apparatus in accordance with a discrimination result of the discrimination section, and an output section which matches the color signals from the conversion section and the color signals from the processing section and delivers the matched result to the image forming apparatus.

2 Claims, 8 Drawing Sheets

IMAGE PROCESSING APPARATUS

BACKGROUND OF THE INVENTION

The present invention relates to a color image forming apparatus, and more particularly to an image processing apparatus for performing suitable color reproduction in a digital color copying machine, a printer, etc.

In a conventional digital color copying machine, the reflectance of a color image on an original is read by color-separating pixels into R (red), G (green) and B (blue) and is converted to digital image data of three colors, R, G and B. The three-color digital image data is subjected to color correction processes such as a density conversion process, a background color elimination process, a black addition process, and a masking process, and thus digital image density data of four colors, C (cyan), M (magenta), Y (yellow) and K (black), is obtained.

Based on the four-color digital image density data, a dot image that is a digital image is recorded on copying paper.

With the development of device-independent color reproduction technology, various color gamut compression methods have been proposed. In particular, in recent years, with the prevalence of digital cameras, household scanners and printers, not only office users but also personal users have more opportunities to treat color image data between devices with different expressible color regions.

There is a strong demand for image data processing which can be performed by a preferable color gamut compression method without adjustment by non-skilled users.

Jpn. Pat. Appln. KOKAI Publication No. 7-298073, for instance, proposes a method wherein a user designates the limitations to the hue and chroma in the clipping of a color gamut. However, general users do not have a definite criterion, for example, on the concept "color is dense", as to whether this means that the chroma is high or the brightness is low. It is very difficult to demand that the users perform the adjustment of this publication.

The article titled "Adaptive color gamut mapping method based on image dependency" appearing in the "The Journal of The Institute of Image Electronics Engineers of Japan", Vol. 29, No. 5 (2000), shows a method of automatically adjusting the weight of chroma and brightness in accordance with image modes. However, it is most desirable to perform color gamut compression suitable to an original in a default mode (generally a character/print photo mode).

As has been described above, according to conventional color gamut compression methods, it is difficult for general non-skilled users to achieve desired color reproduction with respect to an original which is an object of printing-out, and the users have to perform time-consuming procedures.

BRIEF SUMMARY OF THE INVENTION

The object of the present invention is to provide an image processing apparatus which can subject an original, which is an object of printing-out, to most suitable color gamut compression, thereby performing most suitable color reproduction.

In order to achieve the object, the present invention may provide an image processing apparatus which processes a plurality of supplied color image signals and outputs the processed signals to an image forming apparatus, the image processing apparatus comprising: a conversion section which converts the plurality of supplied color image signals to a plurality of color signals; a discrimination section which discriminates attributes of the plurality of supplied color image signals; a determination section which determines, based on the plurality of color signals converted by the conversion section, a plurality of color signals outside a color gamut capable of image formation in the image forming apparatus; a processing section which changes the plurality of color signals outside the color gamut determined by the determination section to a plurality of color signals in the color gamut of the image forming apparatus in accordance with a discrimination result of the discrimination section; and an output section which matches the plurality of color signals from the conversion section and the plurality of color signals from the processing section and delivers the matched result to the image forming apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
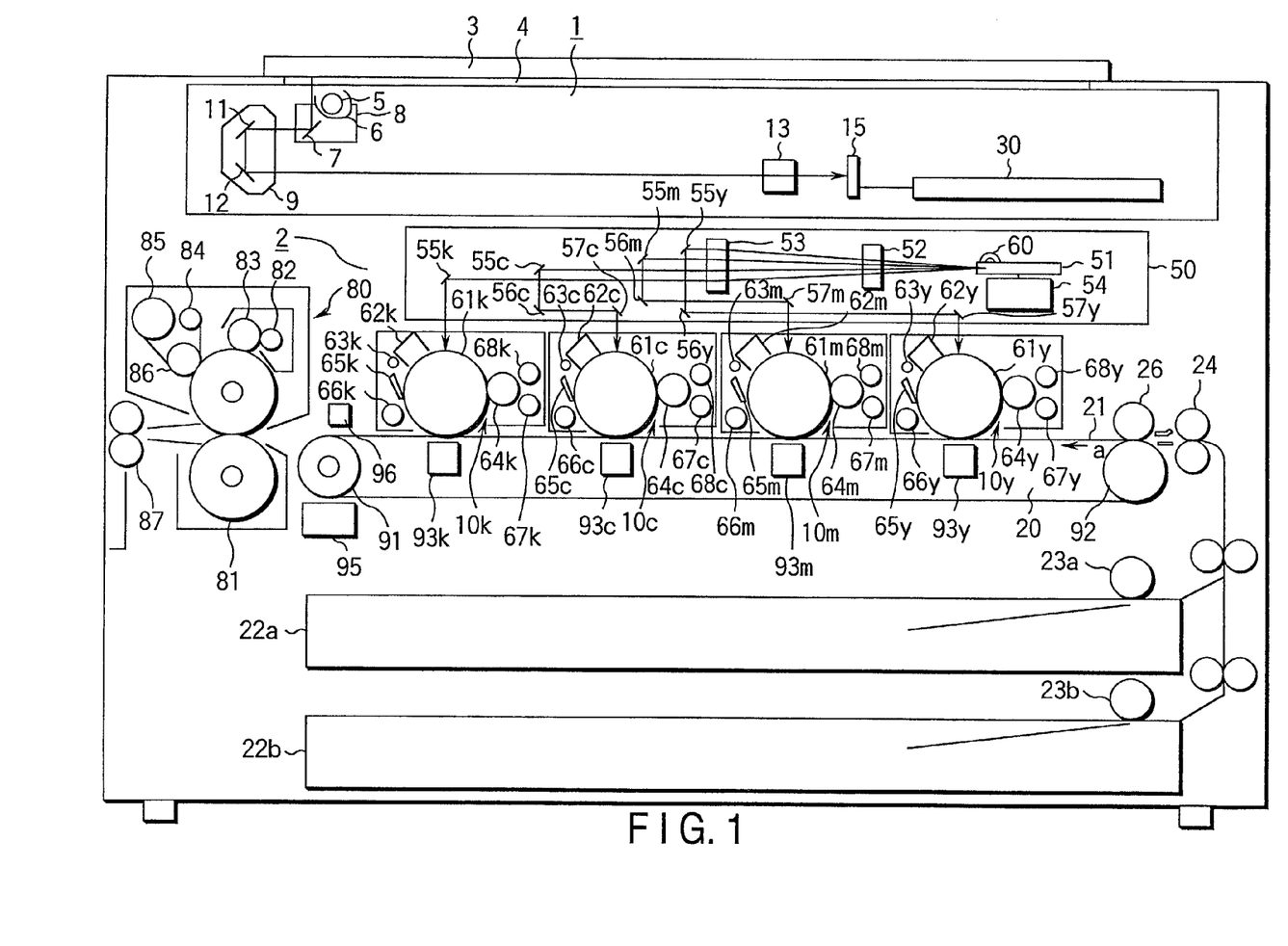
FIG. 1 is a cross-sectional view schematically showing an internal structure of a digital color copying machine having an image processing apparatus according to the present invention and forming a copy image of a color image.

FIG. 1 schematically shows an internal structure of a digital color copying machine having an image processing apparatus according to the present invention, and forming a copy image of a color image. In general terms, the digital color copying machine comprises a color scanner section 1 serving as image reading means for reading a color image on an original, and a color printer section 2 serving as image forming means for forming a copy image of the read color image.

The color scanner section 1 has an original table cover 3 on its upper part, and an original table 4 formed of transparent glass and disposed to face the original table cover 3 in the closed state. An original is placed on the original table 4. Below the original table 4, there are provided an exposure lamp 5 for illuminating the original placed on the original table 4; a reflector 6 for converging light from the exposure lamp 5 onto the original; and a first mirror 7 for deflecting the reflection light from the original to the left in the figure. The exposure lamp 5, reflector 6 and first mirror 7 are fixed to a first carriage 8. The first carriage 8 is driven by a pulse motor (not shown) by means of a toothed belt (not shown), etc. so that the first carriage 8 may be moved in parallel along the lower surface of the original table 4.

A second carriage 9 is disposed on the left side (in the figure) of the first carriage 8, that is, on the side to which reflection light from the first mirror 7 is guided. The second carriage 9 is movable in parallel to the original table 4 by means of a drive mechanism (not shown) (e.g. a toothed belt and a DC motor). The second carriage 9 comprises a second mirror 11 for downwardly (in the figure) deflecting the reflection light from the original which has been guided by the first mirror 7, and a third mirror 12 for deflecting the reflection from the second mirror 11 to the right in the figure. The second mirror 11 and third mirror 12 are disposed at right angles to each other. The second carriage 9 follows the movement of the first carriage 8 and moves in parallel to the original table 4 at a speed equal to half the speed of the first carriage 8.

A focusing lens 13 for focusing the reflection light from the third mirror 12 at a predetermined magnification is disposed in a plane including an optical axis of the light deflected by the second and third mirrors 11 and 12. A CCD color image sensor (photoelectric conversion element) 15 for converting the reflection light converged by the focusing lens 13 to an electric signal is disposed in a plane substantially perpendicular to the optical axis of the light traveling through the focusing lens 13.

If light from the exposure lamp 5 is converged onto the original placed on the original table 4 by means of the reflector 6, the reflection light from the original is made incident on the color image sensor 15 via the first mirror 7, second mirror 11, third mirror 12 and focusing lens 13. The color image sensor 15 converts the incident light to electric signals of the three primary colors, R (red), G (green) and B (blue).

The color printer section 2 has first to fourth image forming units 10y, 10m, 10c and 10k for producing images of four colors, yellow (Y), magenta (M), cyan (C) and black (K), which are color-separated according to a well-known subtractive color mixing process.

A convey mechanism 20 is disposed below the image forming units 10y, 10m, 10c and 10k. The convey mechanism 20 includes a convey belt 21 serving as convey means for conveying color images produced by the respective image forming units in a direction indicated by an arrow a. The convey belt 21 is passed between a driving roller 91 rotated by a motor (not shown) in the direction of arrow a and a driven roller 92 disposed apart from the driving roller 91 by a predetermined distance. The convey belt 21 is endlessly run in the direction of arrow a at a fixed speed. The image forming units 10y, 10m, 10c and 10k are arranged in tandem in the direction of conveyance of the convey belt 21.

Each of the image forming unit 10y, 10m, 10c and 10k includes a photosensitive drum 61y, 61m, 61c, 10k serving as an image carrying body. The photosensitive drums 61y, 61m, 61c and 61k have outer peripheral surfaces which are rotatable in the same direction at points of contact with the convey belt 21. The photosensitive drums 61y, 61m, 61c and 61k are rotated by a motor (not shown) at a predetermined speed.

The photosensitive drums 61y, 61m, 61c and 61k are disposed to have their axes arranged at regular intervals from one another and in a direction perpendicular to the direction in which images are conveyed by the convey belt 21. In the description below, assume that the axial direction of each photosensitive drum 61y, 61m, 61c, 61k is referred to as a main scan direction (second direction), and the rotational direction of each photosensitive drum 61y, 61m, 61c, 61k, that is, the direction of running of the convey belt 21 (the direction of arrow a), is referred to as a sub-scan direction (first direction).

Around each of the photosensitive drum 61y, 61m, 61c and 61k, the following elements are disposed in order in the rotational direction: a charging device 62y, 62m, 62c, 62k serving as charging means, extended in the main scan direction; a destaticizer 63y, 63m, 63c, 63k; a developing roller 64y, 64m, 64c, 64k serving as developing means, similarly extended in the main scan direction; a lower stirring roller 67y, 67m, 67c, 67k; an upper stirring roller 68y, 68m, 68c, 68k; a transfer device 93y, 93m, 93c, 93k serving as transfer means, similarly extended in the main scan direction; a cleaning blade 65y, 65m, 65c, 65k similarly extended in the main scan direction; and a waste toner recovering screw 66y, 66m, 66c, 66k.

Each transfer device 93y, 93m, 93c, 93k is disposed at such a position as to sandwich the convey belt 21 between itself and the photosensitive drum 61y, 61m, 61c, 61k, that is, inside the convey belt 21. In addition, an exposure point by an exposure device 50 (to be described later) is formed on that portion of the outer peripheral surface of each photosensitive drum 61y, 61m, 61c, 61k, which lies between the charging device 62y, 62m, 62c, 62k and the developing roller 64y, 64m, 64c, 64k.

Sheet cassettes 22a, 22b containing paper sheets P as image formation media, on which images formed by the image forming units 10y, 10m, 10c, 10k are to be transferred, are disposed below the convey mechanism 20.

A pick-up roller 23a, 23b is disposed at one end of each of the sheet cassettes 22a, 22b and on a side close to the driven roller 92. The pick-up roller 23a, 23b picks up sheets P one by one from the uppermost one from the sheet cassette 22a, 22b. Register rollers 24 are disposed between the pickup rollers 23a, 23b and the driven roller 92. The register rollers 24 register and align a leading edge of the sheet P picked up from the sheet cassette 22a, 22b with a leading edge of a y-toner image formed on the photosensitive drum 61y of the image forming unit 10y.

Toner images formed on the other photosensitive drums 61m, 61c and 61k are brought to respective transfer positions in accordance with the transfer timing of the sheet P conveyed on the convey belt 21.

An attraction roller 26 for providing an electrostatic attraction force to the sheet P conveyed at the predetermined timing via the register rollers 24 is disposed between the register rollers 24 and the first image forming unit 10y, and near the driven roller 92, that is, substantially over the outer peripheral surface of the driven roller 92 with the convey belt 21 interposed. The axis of the attraction roller 26 and the axis of the driven roller 92 are set to be parallel to each other.

A position error sensor 96 for sensing a position of the image formed on the sheet P on the convey belt 21 is disposed in a region at one end of the convey belt 21, and near the driving roller 91, that is, substantially over the outer peripheral surface of the driving roller 91 with the convey belt 21 interposed. The position error sensor 96 comprises, for example, a light transmission type or a light reflection type optical sensor.

A convey belt cleaning device 95 for removing toner adhering to the convey belt 21 or paper dust of the sheet P is disposed at the outer peripheral surface of the driving roller 91, in contact with the convey belt 21 on the downstream side of the position error sensor 96.

A fixing device 80 is disposed in a region to which the sheet P conveyed by the convey belt 21 and separated from the driving roller 91 is delivered. The fixing device 80 heats the sheet P at a predetermined temperature, melts the toner image transferred on the sheet P, and fixes the toner image on the sheet P. The fixing device 80 comprises a heat roller pair 81, oil apply rollers 82 and 83, a web winding roller 84, a web roller 85, and a web press roller 86. The toner on the sheet P is fixed and the sheet P with the fixed toner image is discharged by a discharge roller pair 87.

The exposure device 50 forms color-separated electrostatic latent images on outer peripheral surfaces of the respective photosensitive drums 61y, 61m, 61c and 61k. The exposure device 50 has a semiconductor laser 60. The light emission from the semiconductor laser 60 is controlled on the basis of image data (y, m, c, k) of respective colors separated by an image processing apparatus 63 (to be described below). A polygon mirror 51 rotated by a polygon motor 54 to reflect and scan laser beams and fθ lenses 52 and 53 for focusing the laser beams reflected by the polygon mirror 51 by correcting their focal points are disposed in the named order along the optical path of the semiconductor laser 60.

First deflection mirrors 55y, 55m, 55c and 55k for deflecting the respective color laser beams emanating from the fθ lens 53 toward the exposure points on the photosensitive drums 61y, 61m, 61c and 61k, and second and third deflection mirrors 56y, 56m, 56c, 57y, 57m and 57c for further deflecting the laser beams deflected by the first deflection mirrors 55y, 55m and 55c are disposed between the fθ lens 53 and the photosensitive drums 61y, 61m, 61c and 61k.

The laser beam for black is deflected by the first deflection mirror 55k and then directly guided to the photosensitive drum 61k without intervention of other mirrors.

Figure 2:
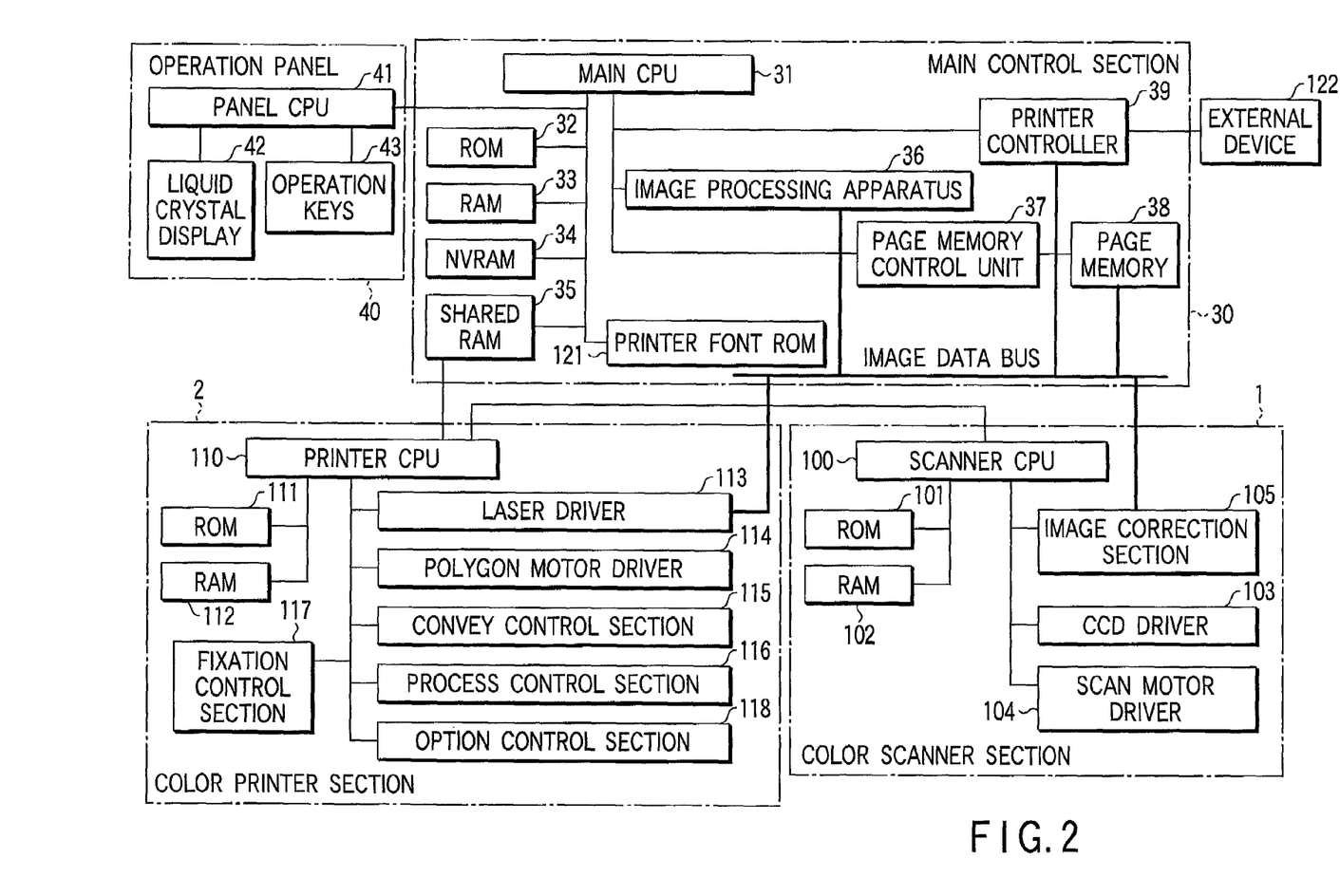
FIG. 2 is a block diagram schematically illustrating electrical connection in the digital color copying machine and a flow of signals for control.

FIG. 2 is a block diagram schematically showing electrical connection of the digital color copying machine shown in FIG. 1 and flow of signals for control. In FIG. 2, a control system comprises three CPUs (Central Processing Units): a main CPU 31 provided in a main control section 30; a scanner CPU 100 in the color scanner section 1; and a color printer CPU 110 in the color printer section 2.

The main CPU 31 performs bi-directional communication with the printer CPU 110 via a shared RAM (Random Access Memory) 35. The main CPU 31 issues an operational instruction, and the printer CPU 110 returns status data. Serial communication is performed between the printer CPU 110 and scanner CPU 100. The printer CPU 110 issues an operational instruction, and the scanner CPU 100 returns status data.

An operation panel 40 comprises a liquid crystal display 42, various operation keys 43 and a panel CPU 41 to which these are connected. The operation panel 40 is connected to the main CPU 31.

The main control section 30 comprises the main CPU 31, a ROM (Read-Only Memory) 32, a RAM 33, an NVRAM 34, shared RAM 35, image processing apparatus 36, a page memory control unit 37, a page memory 38, a printer controller 39, and a printer font ROM 121.

The main CPU 31 controls the entirety of the main control section 30. The ROM 32 stores control programs, etc. The RAM 33 temporarily stores data.

The NVRAM (Non-Volatile RAM) 34 is a non-volatile memory backed up by a battery (not shown), and even when power is not supplied, stored data is maintained.

The shared RAM 35 is used to perform bi-directional communication between the main CPU 31 and printer CPU 110.

The page memory control unit 37 stores and read out image information in and from the page memory 38. The page memory 38 has areas capable of storing image information of a plurality of pages. The page memory 38 can store compressed data in units of a page, which is obtained by compressing image information from the color scanner section 1.

The printer font ROM 121 stores font data corresponding to print data. The printer controller 39 develops print data, which is sent from an external device 122 such as a personal computer, into image data using the font data stored in the printer font ROM 121 with a resolution corresponding to resolution data added to the print data.

The color scanner section 1 comprises the scanner CPU 100 for controlling the entirety of the color scanner section 1; a ROM 101 storing control programs, etc.; a data storage RAM 102; a CCD driver 103 for driving the color image sensor 15; a scan motor driver 104 for controlling the rotation of a scan motor for moving the first carriage 8, etc.; and an image correction section 105.

The image correction section 105 comprises an A/D converter for converting R-, G- and B-analog signals output from the color image sensor 15 to digital signals; a shading correction circuit for correcting a variance in the color image sensor 15 or a variation in threshold level due to ambient temperature variation relative to the output signal from the color image sensor 15; and a line memory for temporarily storing shading-corrected digital signals from the shading correction circuit.

The color printer section 2 comprises the printer CPU 110 for controlling the entirety of the color printer section 2; a ROM 111 storing control programs, etc.; a data storage RAM 112; a laser driver 113 for driving the semiconductor laser 60; a polygon motor driver 114 for driving the polygon motor 54 of the exposure device 50; a convey control section 115 for controlling conveyance of the sheet P by the convey mechanism 20; a process control section 116 for controlling charging, developing and transferring processes using the charging device, developing roller and transfer device; a fixation control section 117 for controlling the fixing device 80; and an option control section 118 for control options.

The image processing apparatus 36, page memory 38, printer controller 39, image correction section 105 and laser driver 113 are connected over an image data bus 120.

Figure 3:
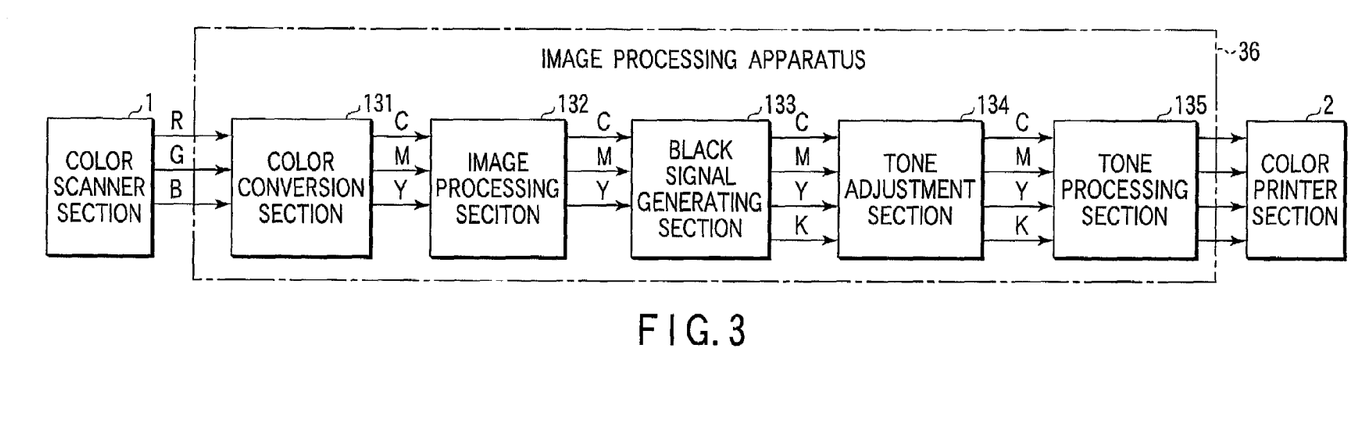
FIG. 3 schematically shows the structure of the image processing apparatus.

FIG. 3 schematically shows the structure of the image processing apparatus 36. In FIG. 3, color image data R (red), G (green), B (blue) output from the color scanner section 1 as color image signals is sent respectively to a color conversion section 131 in the image processing apparatus 36. The color conversion section 131 converts the input color image data R, G, B to color signals of C (cyan), M (magenta) and Y (yellow). The color signals C, M and Y from the color conversion section 131 are sent to an image processing section 132. The image processing section 132 subjects the input color signals C, M and Y to various processings such as filtering. Color signals C, M and Y output from the image processing section 132 are delivered respectively to a black signal generating section 133.

The black signal generating section 133 generates a signal of K (black) on the basis of the input color signals C, M and Y. Where color printing is effected, if three inks of C, M and Y are used, gray close to black is produced. In order to exactly print a black area as black pixels, the signal (K) for the black portion is produced. The signals of C, M, Y and K output from the black signal generating section 133 are sent to a tone adjustment section 134.

The tone adjustment section 134 corrects the tone of each of the input signals of C, M, Y and K. The tone-adjusted signals C, M, Y and K output from the tone adjustment section 134 are delivered to a tone processing section 135. The tone processing section 135 subjects the input signals C, M, Y and K to, for instance, an error spread method, in accordance with the number of recordable bits of the color printer section 2. Signals C, M, Y and K output from the tone processing section 135 are delivered to the color printer section 2.

A first embodiment of the invention will now be described on the basis of the above-described structure.

Figure 4:
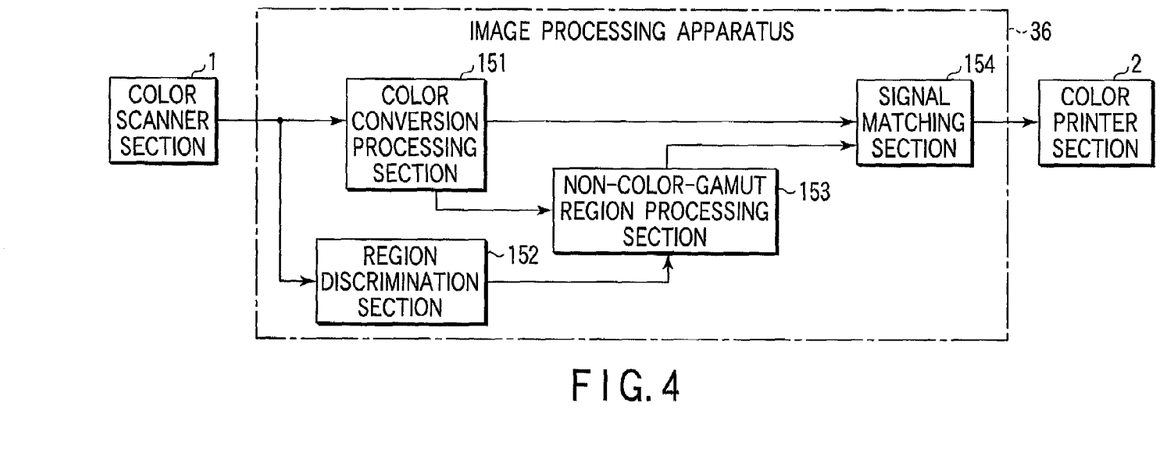
FIG. 4 schematically shows the structure of a main part of an image processing apparatus according to a first embodiment.

FIG. 4 schematically shows the structure of a main part of the image processing apparatus 36 according to the first embodiment. For simple description, the elements other than the color conversion section 131 in FIG. 3 are not shown.

In FIG. 4, color image data supplied from the color scanner section 1 is input to a color conversion processing section 151 and a region discrimination section 152.

The color conversion processing section 151 converts the input color image data R, G, B to color signals of C (cyan), M (magenta) and Y (yellow) and delivers the color signals to a signal matching section 154. In addition, when there are color signals which are non-reproducible in the color printer section 2 of the output system (color signals in a region outside the color gamut reproducible by the color printer section 2; hereinafter referred to as "non-color-gamut region"), the color conversion processing section 151 delivers them to a non-color-gamut region processing section 153.

For example, in a case where each signal value in the color printer section 2 is assigned in a range of 0–1, if any one of the color signals has a value less than 0 or greater than 1, the color conversion processing section 151 delivers the color signals to the non-color-gamut region processing section 153.

The region discrimination section 152 discriminates whether a pixel of interest in the color image data output from the color scanner section 1 belongs to a character region (character portion) or a non-character region (non-character portion).

For example, the region discrimination section 152 divides an image of interest into a plurality of regions, and subjects all pixels in the regions to a frequency analysis process and an edge component detection process. The resolution for reading in the frequency analysis needs to be higher (at least about 300 dpi/inch) than a general quasi-intermediate tone level (about 200 lines/inch).

The non-color-gamut region processing section 153 changes the pixel of each signal, which has been determined to be in the non-color-gamut region of the color printer section 2, to a most suitable color in the color gamut reproducible by the color printer section 2 (by a color gamut compression process or clipping process). Specifically, in accordance with the result of the region discrimination section 152 as to whether the pixel of interest belongs to the character region or the non-character region, the non-color-gamut region processing section 153 performs the process (with different parameters) for matching with the color gamut of the color printer 2 and delivers the result to the signal matching section 154.

The signal matching section 154 matches the color signals from the color conversion processing section 151 with the color signals from the non-color-gamut region processing section 153 and delivers the matched result to the color printer section 2. Thus, the color printer section 2 receives only the color signals reproducible in the color printer section 2.

Figure 5:
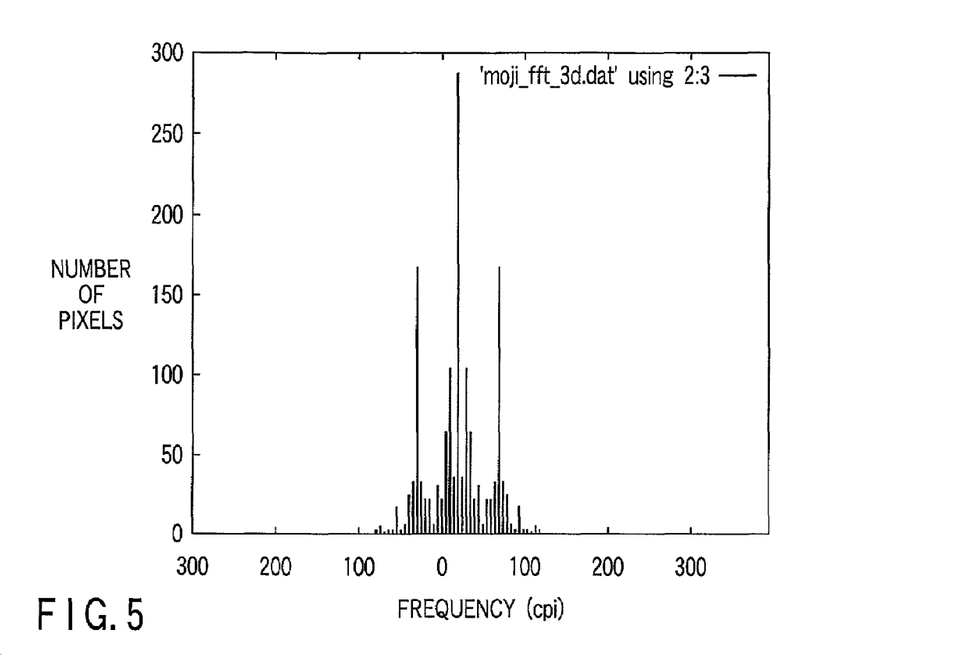
FIG. 5 shows a frequency distribution on a character original.
Figure 6:
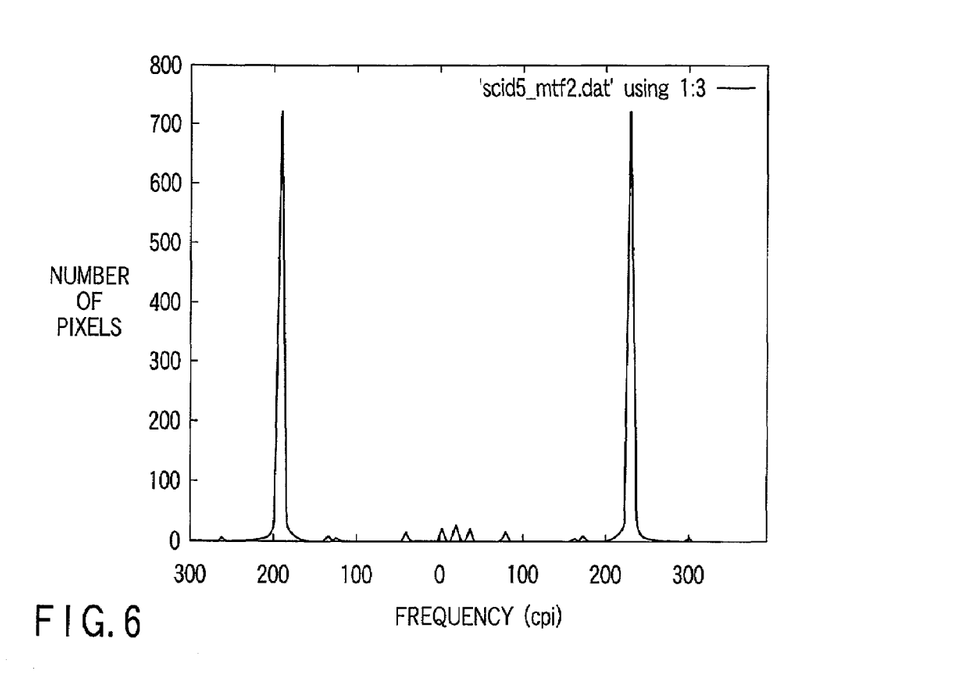
FIG. 6 shows a frequency distribution on a mesh-dot original.

FIG. 5 shows a frequency distribution on a character original, and FIG. 6 shows a frequency distribution on a mesh-dot original. As is understood from comparison between FIGS. 5 and 6, the frequency distribution of a mesh-dot image, as shown in FIG. 6, has very high peaks at specific high-frequency regions corresponding to the cycle of the mesh-dot.

The character original shown in FIG. 5 has some peaks at Nyquist frequencies of the reading system. However, compared to peaks characteristic of the mesh-dot, the magnitudes of the peak values on the character document are small and the frequency thereof is present at the relatively low-frequency region.

Thus, the frequency region for checking the presence of a peak is preset, and the peak value is compared with a predetermined threshold. If there is a peak value higher than the threshold, it is determined that the presence of a character is highly possible.

Furthermore, a frequency region, which is higher than the frequency region in which the above peak has been checked, is set. If the presence of a peak value higher than a predetermined threshold (higher than the above-mentioned threshold value) is confirmed, the presence of a mesh-dot image is determined.

Even from the frequency analysis alone, the presence/absence of a character in an image or region of interest can be understood to some degree. However, in order to discriminate the character original and photo original, it is possible to apply to the discrimination process the characteristic amount which is used in a BAT method (determination of the presence/absence of an edge component) proposed in, e.g. Jpn. Pat. Appln. KOKAI Publication No. 58-3374.

Figure 7:
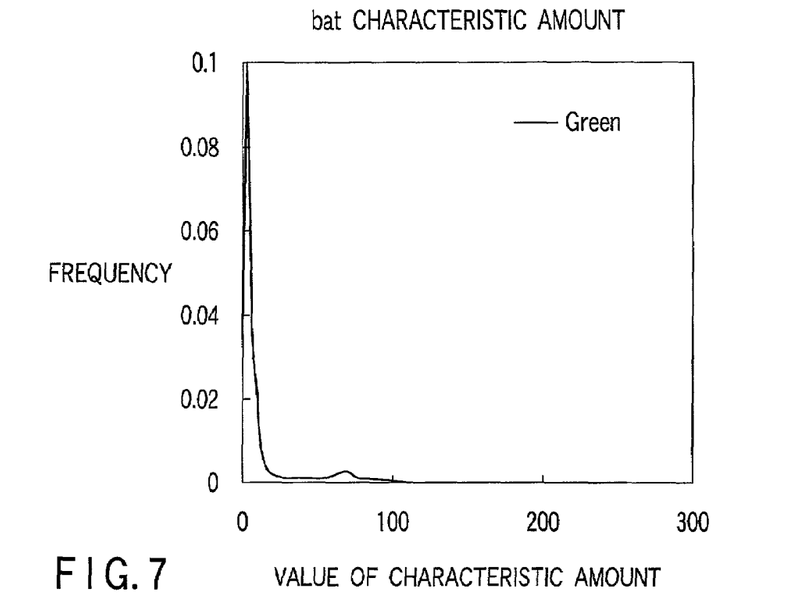
FIG. 7 shows a histogram of characteristic amount of a character original by a BAT method.
Figure 8:
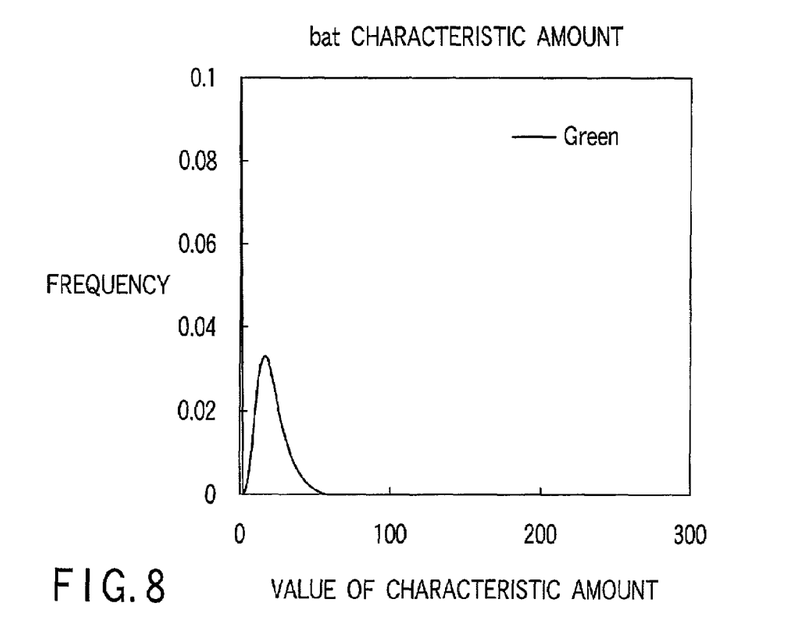
FIG. 8 shows a histogram of characteristic amount of a photo original by a BAT method.

FIGS. 7 and 8 are histograms of characteristic amounts on a character original (Green) and a photo original (Green) obtained by a BAT method. In FIGS. 7 and 8, the characteristic amounts for green are obtained, because the characteristics of green are exhibited in a relatively good manner. Alternatively, characteristic amounts of red, green and blue may be obtained.

As regards the character image shown in FIG. 7, there is a pixel with a characteristic amount of a predetermined value or more. By contrast, as regards the photo original shown in FIG. 8, there is substantially no such pixel.

The region discrimination section 152 extracts a character original document or a character region by using both of the above discrimination methods.

The non-color-gamut region processing section 153 will now be described.

In general terms, as regards the processing for the non-color-gamut region, in the case where the chromaticity of the pixel (object point) of input color image data is out of the expressible color gamut of the output system such as the color printer, if the value thereof is simply out of the range of 0 to 1, only a signal out of this range is clipped at a maximum value or a minimum value. Alternatively, the object point on the uniform color space is changed to a smallest-distance point on the outermost color-gamut region which is located at the outermost side of the color gamut of the output system.

The present invention has achieved improvement by the latter method.

Figure 9:
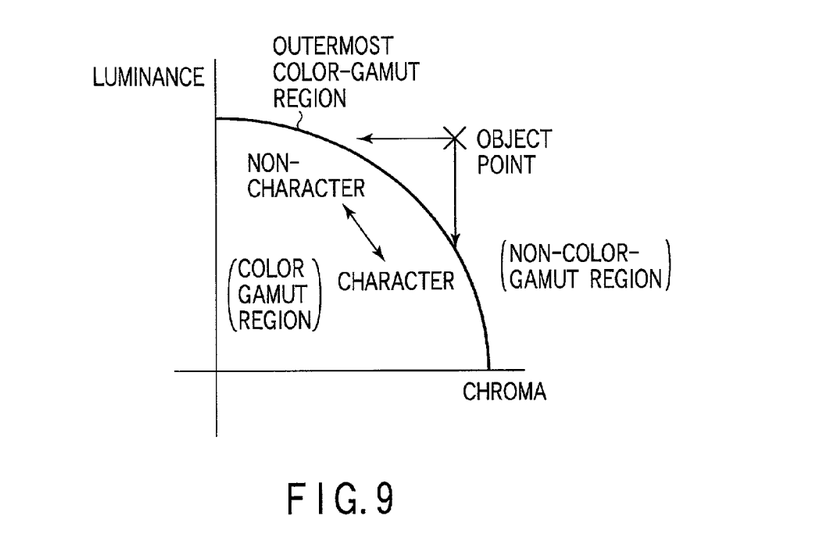
FIG. 9 shows a color-gamut region, a non-color-gamut region, and an outermost color-gamut region in a color printer section.

FIG. 9 shows a color-gamut region, a non-color-gamut region, and an outermost color-gamut region in the color printer section 2 serving as the output system. The ordinate indicates luminance, and the abscissa indicates chroma. A curve connecting the luminance on the ordinate and the chroma on the abscissa denotes the outermost color-gamut region, which indicates a borderline between the color-gamut region and non-color-gamut region of the color printer section 2.

The non-color-gamut region processing section 153 matches the hues, irrespective of the result of the region discrimination section 152. Then, in the region (character portion) where an object point outside the color-gamut region in FIG. 9 is discriminated as a character by the region discrimination section 152, the non-color-gamut region processing section 153 brings the output signal to that point on the outermost color-gamut region, which has a closest chroma.

On the other hand, in the region (non-character portion) where an object point outside the color-gamut region in FIG. 9 is discriminated as a photo original or a mesh-dot original by the region discrimination section 152, the non-color-gamut region processing section 153 gives priority to the luminance rather than the chroma and brings the output signal to that point on the outermost color-gamut region, which has a closest luminance.

Specifically, the non-color-gamut region processing section 153 defines the distance between the object point in the non-color-gamut region and the outermost color-gamut region on the L*c*h* uniform color space as shown below, and a point which reduces the distance to a minimum is determined to be a target point.

$$S = W1 \cdot L^{*2} + Wc \cdot c^{*2} + Wh \cdot h^{*2}$$

wherein W1, Wc and Wh indicate weighting coefficients for L*, c* and h*. When the object is a character original, $Wh \geq Wc \geq W1$. Otherwise, $Wh \geq W1 \geq Wc$.

As described above, the output is corrected to agree with the point on the outermost color-gamut region of the output system, at which the object point in the non-color-gamut region has a smallest value. Thereby, a clear output image of a character is obtained. In the case of an original such as a photo, for which priority is given to the original colors, a more natural output image can be obtained.

Figure 10:
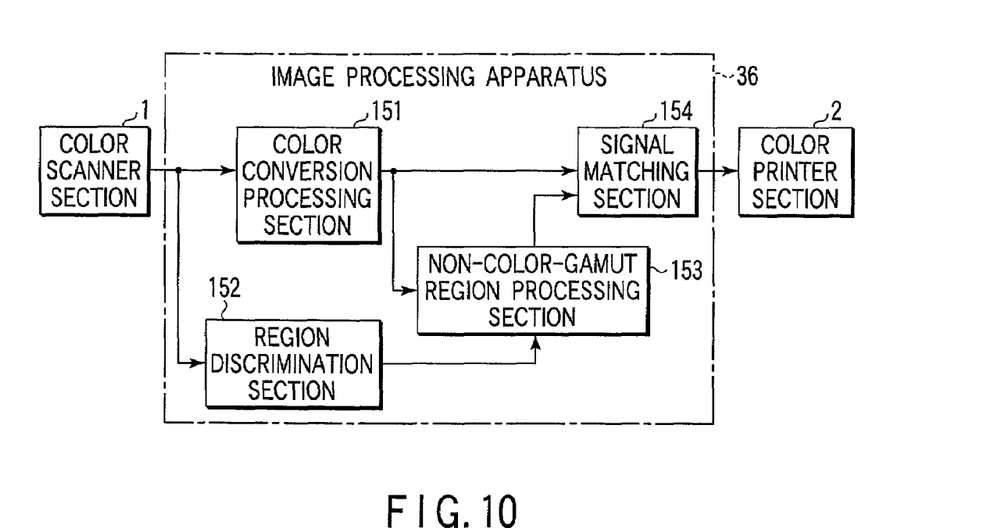
FIG. 10 schematically shows the structure of a main part of an image processing apparatus according to a modification of the first embodiment.

FIG. 10 shows a modification of the structure of the first embodiment shown in FIG. 4. In this structure, all color signals converted by the color conversion processing section 151 are input to the non-color-gamut processing section 153. The color signals from the color conversion processing section 151 and the color signals from the non-color-gamut processing section 153 are input to the signal matching section 154. The signal matching section 154 matches these signals and outputs the result to the color printer section 2. Thus, the same advantage as in the first embodiment shown in FIG. 4 can be obtained.

In the first embodiment shown in FIG. 4 an d the modification, the image processing apparatus is constituted by the color conversion section 131 shown in FIG. 3. Alternatively, it may be constituted by the color conversion section 131 and image processing section 132.

The non-color-gamut region processing section 153 may perform a mapping process wherein a region, where the presence of a character has been confirmed by the region discrimination section 152, is compared with a non-character region, with priority given to the chroma among the hue, chroma and luminance.

A second embodiment will now be described.

Figure 11:
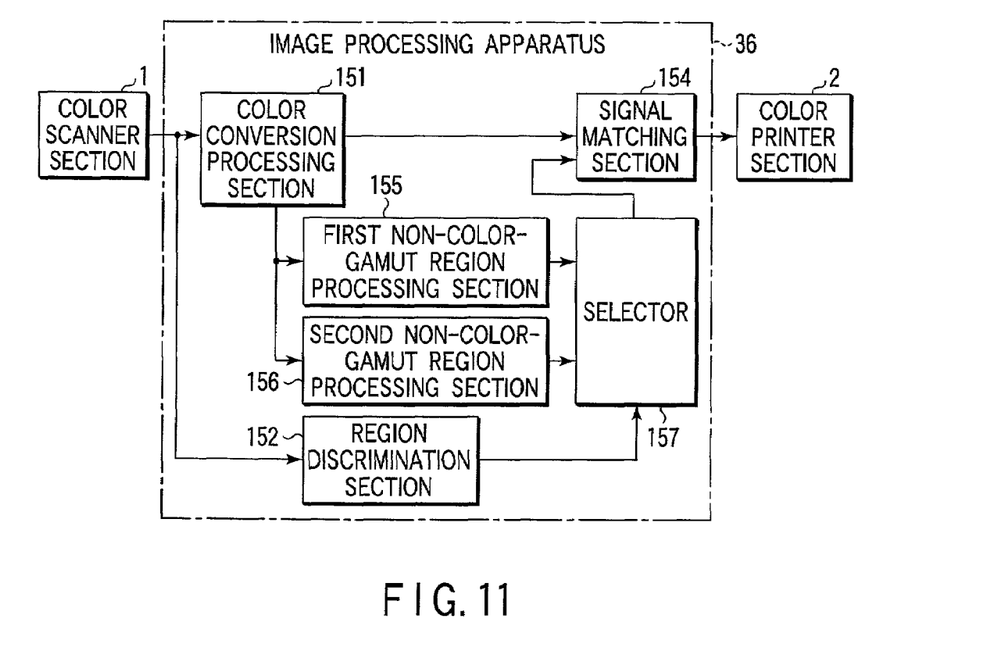
FIG. 11 schematically shows the structure of a main part of an image processing apparatus according to a second embodiment.

FIG. 11 schematically shows the structure of the image processing apparatus 36 according to the second embodiment. In FIG. 11, like FIG. 4, for the purpose of simple description, the elements other than the color conversion section 131 of the invention are not shown.

In the second embodiment, unlike the first embodiment, the calculation method in the non-color-gamut region processing section is not changed in accordance with the result of discrimination. A first non-color-gamut region processing section for processing a character portion and a second non-color-gamut region processing section for processing a non-character portion calculate correction values in the non-color-gamut region, respectively. A value to be delivered to the output system is switched by a selector on the basis of the determination result of the region discrimination section. Thus, a suitable process is performed.

In FIG. 11, color image data supplied from the color scanner section 1 is input to the color conversion processing section 151 and region discrimination section 152.

The color conversion processing section 151 converts the input color image data R, G, B to color signals of C (cyan), M (magenta) and Y (yellow) and delivers the color signals to the signal matching section 154. In addition, when there are color signals which are non-reproducible in the color printer section 2 of the output system (color signals in the non-color-gamut region outside the color gamut reproducible by the color printer section 2), the color conversion processing section 151 delivers the color signals to a first non-color-gamut region processing section 155 and a second non-color-gamut region processing section 156.

For example, in a case where each signal value in the color printer section 2 is assigned in a range of 0–1, if any one of the color signals has a value less than 0 or greater than 1, the color conversion processing section 151 delivers the color signals to the first non-color-gamut region processing section 155 and second non-color-gamut region processing section 156.

The first non-color-gamut region processing section 155 changes the pixel of each signal, which has been determined to be in the non-color-gamut region of the color printer section 2, to a most suitable color in the color gamut reproducible by the color printer section 2 in association with the character portion (calculation of a correction value; a color gamut compression process or clipping process).

The second non-color-gamut region processing section 156 changes the pixel of each signal, which has been determined to be in the non-color-gamut region of the color printer section 2, to a most suitable color in the color gamut reproducible by the color printer section 2 in association with the non-character portion (calculation of a correction value; a color gamut compression process or clipping process).

On the other hand, the region discrimination section 152 discriminates whether a pixel of interest in the color image data output from the color scanner section 1 belongs to a character region (character portion) or a non-character region (non-character portion), and outputs a resultant discrimination signal to a selector 157.

If the discrimination signal indicates the character portion, the selector 157 delivers the signal from the first non-color-gamut region processing section 155 to the signal matching section 154. If the discrimination signal indicates the non-character portion, the selector 157 delivers the signal from the second non-color-gamut region processing section 156 to the signal matching section 154.

The signal matching section 154 matches the color signals from the color conversion processing section 151 with the color signals from the non-color-gamut region processing section 153 and delivers the matched result to the color printer section 2. Thus, the color printer section 2 receives only the color signals reproducible in the color printer section 2.

In the second embodiment shown in FIG. 11, the image processing apparatus is constituted by the color conversion section 131 shown in FIG. 3. Alternatively, it may be constituted by the color conversion section 131 and image processing section 132.

A third embodiment will now be described.

In the first and second embodiments, the priority is given to the matching of hues. In the third embodiment, the object is a character document, the number of colors used is small, e.g. six, and the hues are differentiated. The structure is the same as shown in FIG. 4, but the processing in the non-color-gamut region processing section 153 is different.

Figure 12:
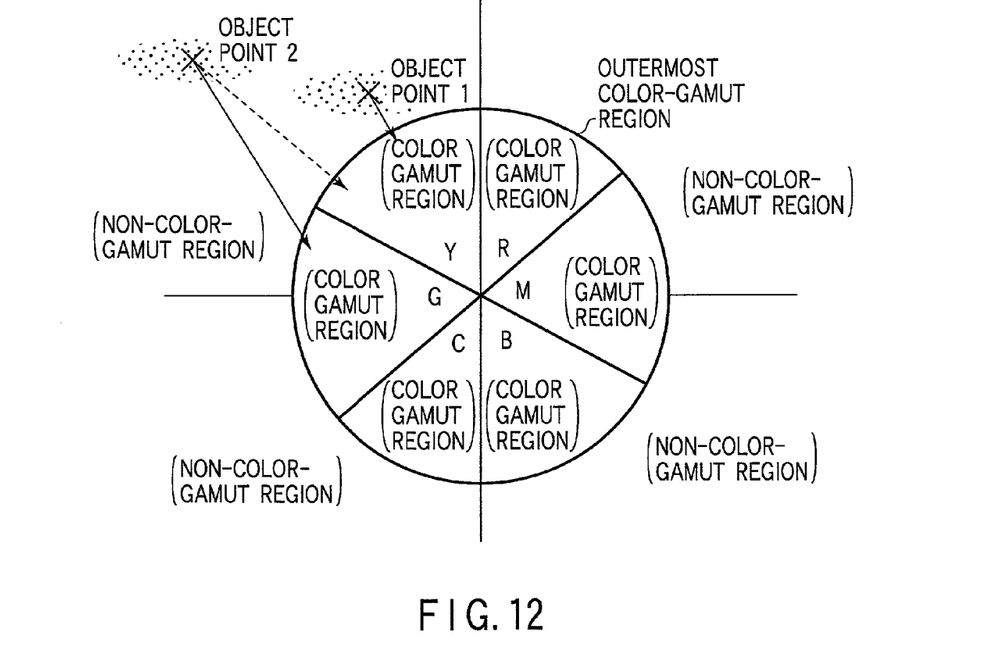
FIG. 12 shows the relationship among colors in color-gamut regions and non-color-gamut regions according to a third embodiment.

FIG. 12 shows a color-gamut region, a non-color-gamut region, and an outermost color-gamut region in the third embodiment. In the color gamut in FIG. 12, R (red), M (magenta), B (blue), C (cyan), G (green) and Y (yellow) are arranged clockwise.

Assume that there are two discrete points, as shown in FIG. 12.

The non-color-gamut region processing section 153 matches the hue of object point 1 and shifts point 1 to the outermost color-gamut region of Y.

However, if the hue of object point 2 was directly matched, an output signal, which is not easily distinguishable from point 1, might be obtained. In such a case, the non-color-gamut region processing section 153 performs the following process.

At the time of pre-scan, the non-color-gamut region processing section 153 determines the number of colors used on the original, and divides the hues into the same number of groups as the number of colors.

In a case where two or more colors belong to the same group if priority is given to hues, the priority is shifted to the chroma. In addition, matching of hue is performed only for a color whose hue can be determined to the closest to a central hue of the group, and the hues of other colors are intentionally shifted to belong to adjacent groups.

In short, the non-color-gamut region processing section 153 intentionally shifts the object point 2 to the outermost color-gamut region of the color gamut of G.

Thereby, an output image easier to discriminate can be obtained.

A fourth embodiment will now be described.

Figure 13:
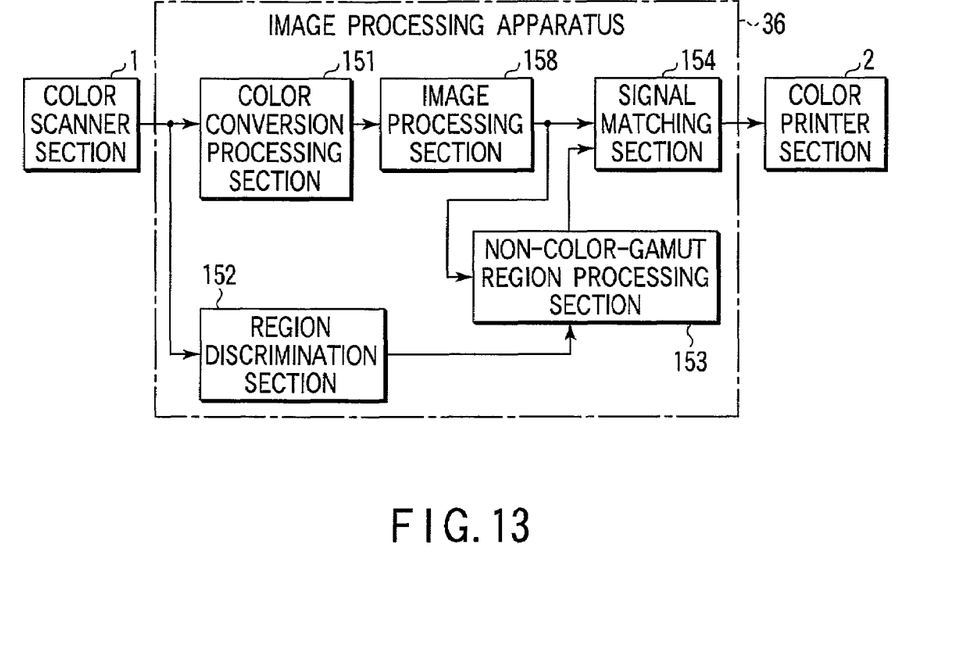
FIG. 13 schematically shows the structure of a main part of an image processing apparatus according to a fourth embodiment.

FIG. 13 schematically shows the structure of the main part of the image processing apparatus 36 according to the fourth embodiment. In FIG. 13, like FIG. 4, for the purpose of simple description, the elements other than the color conversion section 131 of the invention are not shown.

In the fourth embodiment, when a color gamut compression process needs to be performed, correction is made by image processing such as high-region emphasis. In a regular color conversion process, it is possible that a processed result may fall out of a color reproduction region of the output system. Accordingly, after the color conversion processing section has executed the color conversion process, high-region emphasis is effected by an image processing section. A pixel, which does not fall in the region color-reproducible in the output system, is subjected to a color-gamut compression or clipping process in the non-color-gamut region processing section. The procedures of the color-gamut compression and clipping processes are the same as those in the first to third embodiments.

In FIG. 13, color image data supplied from the color scanner section 1 is input to the color conversion processing section 151 and region discrimination section 152.

The color conversion processing section 151 converts the input color image data R, G, B to color signals of C (cyan), M (magenta) and Y (yellow) and delivers the color signals to an image processing section 158.

The region discrimination section 152 discriminates whether a pixel of interest in the color image data output from the color scanner section 1 belongs to a character region (character portion) or a non-character region (non-character portion).

The image processing section 158 subjects the input color signals of C, M and Y to high-region emphasis and delivers the resultant signals to the non-color-gamut region processing section 153 and signal matching section 154.

The non-color-gamut region processing section 153 changes the C, M and Y color signals, which have been subjected to high-region emphasis, to most suitable colors in the color gamut reproducible by the color printer section 2 (a color gamut compression process or clipping process). Specifically, in accordance with the result of the region discrimination section 152 as to whether the pixel to be processed belongs to the character region or the non-character region, the non-color-gamut region processing section 153 performs the process (with different parameters) for matching with the color gamut of the color printer 2 and delivers the result to the signal matching section 154.

The signal matching section 154 matches the color signals from the image processing section 158 with the color signals from the non-color-gamut region processing section 153 and delivers the matched result to the color printer section 2.

Even in the above case where the image processing leads to the departure from the color-reproducible region of the output system, color-gamut compression corresponding to attributes of the image to be processed is effective.

The order of processing in the color conversion processing section 151 and image processing section 158 shown in FIG. 13 may be reversed.

As has been described above, according to the embodiments of the present invention, even where the color-reproducible region of the output system is narrow, compared to the input system, the color gamut compression processing suitable for the respective regions can be performed without effecting special designation in connection with an image including a character and a photo in a mixed fashion.

For example, suitable color reproduction can be realized both for a photo region, for which priority is given to naturalness of color reproduction, and for a character image, for which priority is given to clearness for easy reading rather than to color reproduction.

According to the present invention, even where a character image with a small number of colors and a small difference in chromaticity among the colors when projected on reproduction regions of the output system, an output image with good color separation can be obtained.

In the first, second, third and fourth embodiments, color signals may be processed by either hardware or software.

In the image processing apparatuses of the first, second and fourth embodiments, the color image data is input from the color scanner section 1. Alternatively, color image data input from an external device such as a personal computer can similarly be processed.

Moreover, in the image processing apparatuses of the first, second and fourth embodiments, image formation is effected by the color printer section 2. Alternatively, the image processing apparatus may be connected to another printer, and image processing may be effected with the color gamut reproducible by the printer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus which processes a plurality of supplied color image signals and outputs the processed signals to an image forming apparatus, the image processing apparatus comprising:
    a conversion section which converts said plurality of supplied color image signals to a plurality of color signals;
    a discrimination section which discriminates attributes of said plurality of supplied color image signals;
    a determination section which determines, based on the plurality of color signals converted by the conversion section, a plurality of color signals outside a color gamut capable of image formation in the image forming apparatus;
    a processing section which changes the plurality of color signals outside the color gamut determined by the determination section to a plurality of color signals in the color gamut of the image forming apparatus in accordance with a discrimination result of the discrimination section; and
    an output section which matches the plurality of color signals from the conversion section and the plurality of color signals from the processing section and delivers the matched result to the image forming apparatus,
    wherein said processing section performs, when the discrimination result of the discrimination section is a character portion, a process of matching a hue and effecting shift to an outermost color gamut region closer in chroma than in brightness, and performs, when the discrimination result of the discrimination section is a non-character portion, a process of matching a hue and effecting shift to an outermost color gamut region closer in luminance than in chroma.

2. An image processing apparatus which processes a plurality of supplied color image signals and outputs the processed signals to an image forming apparatus, the image processing apparatus comprising:
    a conversion section which converts said plurality of supplied color image signals to a plurality of color signals;
    an image processing section which subjects the plurality of color signals converted by the conversion section to high-region emphasis;
    a discrimination section which discriminates attributes of said plurality of supplied color image signals;
    a non-color-gamut region processing section which performs a process to change a plurality of color signals outside a color gamut capable of image formation in the image forming apparatus to a plurality of color signals within the color gamut of the image forming apparatus in accordance with a discrimination result of the discrimination section, on the basis of the plurality of color signals subjected to the high-region emphasis in the image processing section; and
    an output section which matches the plurality of color signals from the image processing section and the plurality of color signals from the non-color-gamut region processing section, and delivers the matched result to the image forming apparatus.

* * * * *